(12) United States Patent
Seo et al.

(10) Patent No.: US 9,839,023 B2
(45) Date of Patent: Dec. 5, 2017

(54) METHOD FOR SETTING SEARCH AREA FOR DETECTING DOWNLINK CONTROL INFORMATION IN WIRELESS COMMUNICATION SYSTEM AND APPARATUS FOR SAME

(71) Applicant: LG ELECTRONICS INC., Seoul (KR)

(72) Inventors: Hanbyul Seo, Seoul (KR); Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 14/763,418

(22) PCT Filed: Jan. 23, 2014

(86) PCT No.: PCT/KR2014/000664
§ 371 (c)(1),
(2) Date: Jul. 24, 2015

(87) PCT Pub. No.: WO2014/123316
PCT Pub. Date: Aug. 14, 2014

(65) Prior Publication Data
US 2015/0382326 A1    Dec. 31, 2015

Related U.S. Application Data

(60) Provisional application No. 61/761,694, filed on Feb. 6, 2013.

(51) Int. Cl.
*H04W 72/04*    (2009.01)
*H04W 48/16*    (2009.01)
(Continued)

(52) U.S. Cl.
CPC ......... *H04W 72/042* (2013.01); *H04L 5/0053* (2013.01); *H04W 48/16* (2013.01);
(Continued)

(58) Field of Classification Search
None
See application file for complete search history.

(56) References Cited

U.S. PATENT DOCUMENTS

2010/0254268 A1    10/2010  Kim et al.
2010/0303011 A1    12/2010  Pan et al.
(Continued)

FOREIGN PATENT DOCUMENTS

CN           102651680 A        8/2012
JP    WO 2012011240 A1  *  1/2012  ............. H04L 5/001
(Continued)

OTHER PUBLICATIONS

KDDI "Views on the Physical Layer Enhancements for Small Cells to Improve Spectral Efficiency," 3GPP TSG RAN WG1 Meeting #72, R1-130207, St Julian's, Malta, Jan. 28-Feb. 1, 2013, pp. 1-4.
Pantech, "ePDCCH Monitoring Subframe and Search Space Configuration," 3GPP TSG RAN Working Group 1 Meeting #70bis, R1-124307, San Diego, USA, Oct. 8-12, 2012, pp. 1-4.
(Continued)

*Primary Examiner* — Edan Orgad
*Assistant Examiner* — Saumit Shah
(74) *Attorney, Agent, or Firm* — Birch, Stewart, Kolasch & Birch, LLP

(57) ABSTRACT

Disclosed in the present application is a method for user equipment receiving a control channel from a base station in a wireless communication system. More particularly, the method comprises a step of monitoring control channel candidates in a search area on a first subframe, and receiving the control channel including control information corresponding to each of one or more subframes, beginning with a predetermined number of subframes from the first subframe, wherein when the one or more subframes are pro-
(Continued)

vided in a plurality, the control channel candidates are sorted according to the control information corresponding to each of the plurality of subframes.

8 Claims, 21 Drawing Sheets

(51) Int. Cl.
*H04L 5/00* (2006.01)
*H04W 88/02* (2009.01)
*H04W 88/08* (2009.01)

(52) U.S. Cl.
CPC ....... *H04W 72/0446* (2013.01); *H04L 5/0007* (2013.01); *H04W 88/02* (2013.01); *H04W 88/08* (2013.01)

(56) References Cited

U.S. PATENT DOCUMENTS

| 2010/0309867 | A1 | 12/2010 | Palanki et al. |
| 2011/0273996 | A1* | 11/2011 | Kim ................. H04J 11/0069 370/242 |
| 2013/0016692 | A1 | 1/2013 | Chen et al. |
| 2013/0028205 | A1 | 1/2013 | Damnjanovic et al. |
| 2013/0114563 | A1* | 5/2013 | Oizumi ................. H04L 5/001 370/329 |

FOREIGN PATENT DOCUMENTS

| KR | 10-2009-0102272 A | 9/2009 |
| KR | 10-2010-0071664 A | 6/2010 |
| KR | 10-2010-0110272 A | 10/2010 |

* cited by examiner (a) Control-plane protocol stack (b) User-plane protocol stack (a) 1TX or 2TX (b) 4 TX

METHOD FOR SETTING SEARCH AREA FOR DETECTING DOWNLINK CONTROL INFORMATION IN WIRELESS COMMUNICATION SYSTEM AND APPARATUS FOR SAME

CROSS REFERENCE TO RELATED APPLICATIONS

This application is the National Phase of PCT/KR2014/000664 filed on Jan. 23, 2014, which claims priority under 35 U.S.C. 119(e) to U.S. Provisional Application No. 61/761,694filed on Feb. 06, 2013, all of which are hereby expressly incorporated by reference into the present application.

TECHNICAL FIELD

The present invention relates to a wireless communication system and, more specifically, to a method for setting a search space for detecting downlink control information in a wireless communication system and an apparatus for the same.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method for setting a search space for detecting downlink control information in a wireless communication system and an apparatus for the same.

Technical Solution

In an aspect of the present invention, a method for receiving, by a user equipment (UE), a control channel from a base station in a wireless communication, includes: monitoring control channel candidates in a search space on a first subframe and receiving the control channel including control information corresponding to each of one or more subframes after a predetermined number of subframes from the first subframe, wherein, when the one or more subframes are multiple subframes, the control channel candidates are sorted according to control information respectively corresponding to the multiple subframes.

The receiving of the control channel may include: monitoring the control information candidates in order to detect first control information from among the control information in the first subframe; and monitoring the control information candidates in order to detect second control information from among the control information in a second subframe following the first subframe. The receiving of the control channel may include: monitoring the control information candidates in order to detect the first control information from among the control information in the second subframe following the first subframe; and monitoring the control information candidates in order to detect the second control information from among the control information in a third subframe following the second subframe. A subframe scheduled by the first control information may precede a subframe scheduled by the second control information.

In this case, indices of control channel candidates corresponding to the first control information and indices of control channel candidates corresponding to the second control information may be consecutively set or non-consecutively set according to a predetermined rule.

A resource region in which the search space is set when the one or more subframes correspond to multiple subframes may be larger than a resource region in which the search space is set when the one or more subframes correspond to one subframe. A resource region in which a search space for detecting the first control information is set may differ from a resource region in which a search space for detecting the second control information is set.

In another aspect of the present invention, a UE in a wireless communication, includes: a wireless communication module for transmitting/receiving signals to/from a base station; and a processor for processing the signals, wherein the processor is configured to control the wireless communication module to monitor control channel candidates in a search space on a first subframe and to receive the control channel including control information corresponding to each of one or more subframes after a predetermined number of subframes from the first subframe, wherein, when the one or more subframes are multiple subframes, the control channel candidates are sorted according to control information respectively corresponding to the multiple subframes.

Advantageous Effects

According to embodiments of the present invention, it is possible to efficiently set a search space for detecting downlink control information in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
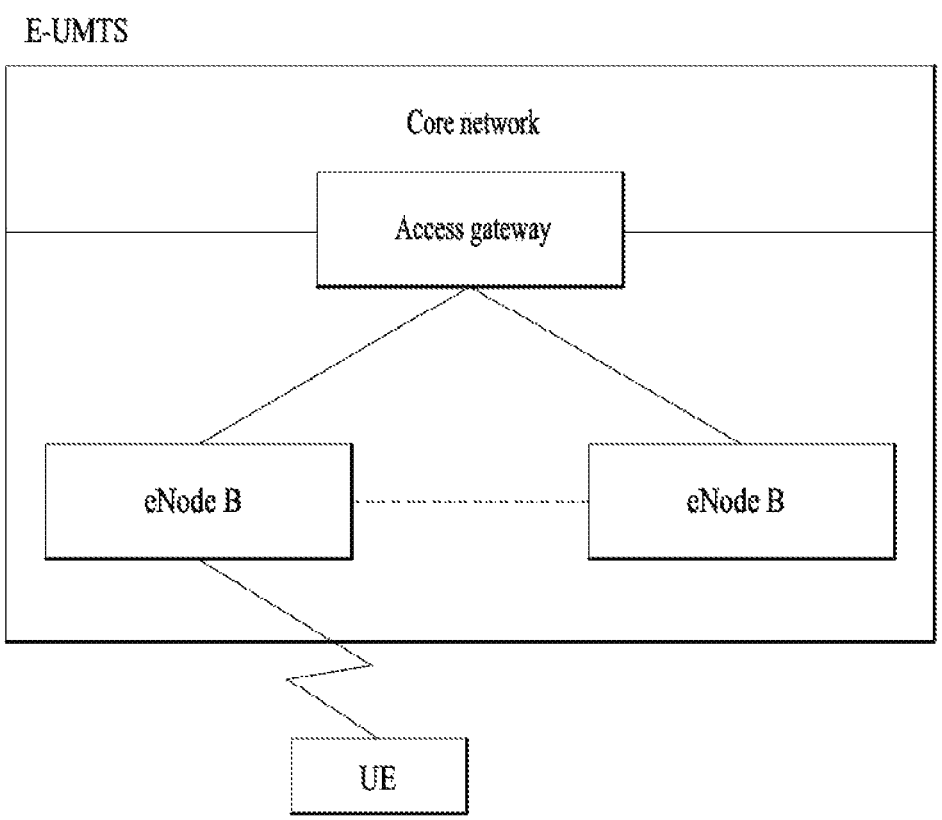
FIG. 1 is a diagram showing a network structure of an Evolved Universal Mobile Telecommunications System (E-UMTS) as an example of a wireless communication system.
Figure 2:
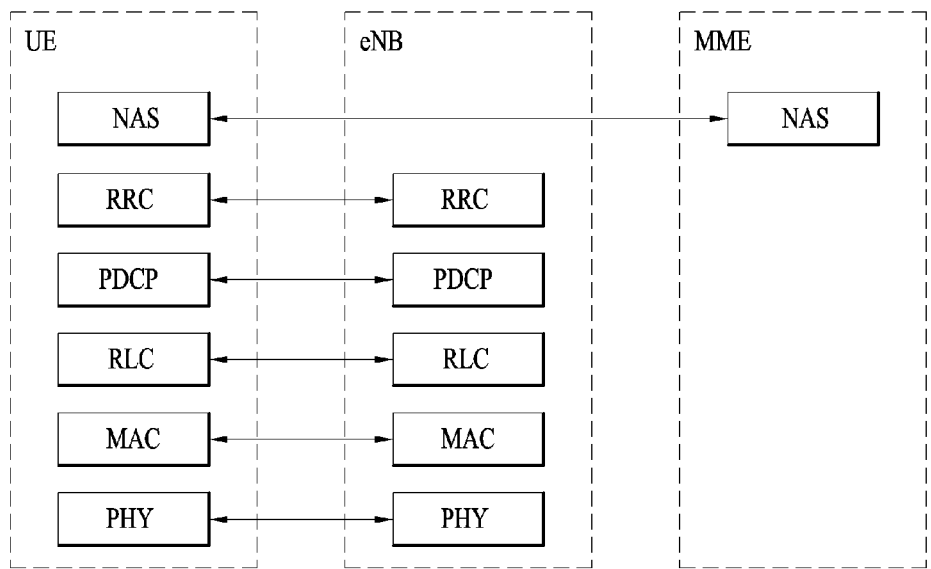
FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.
Figure 2:
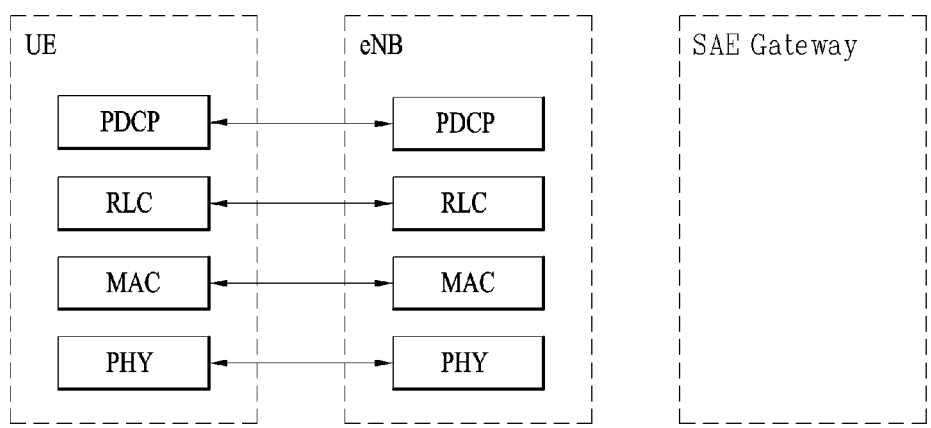

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, Internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
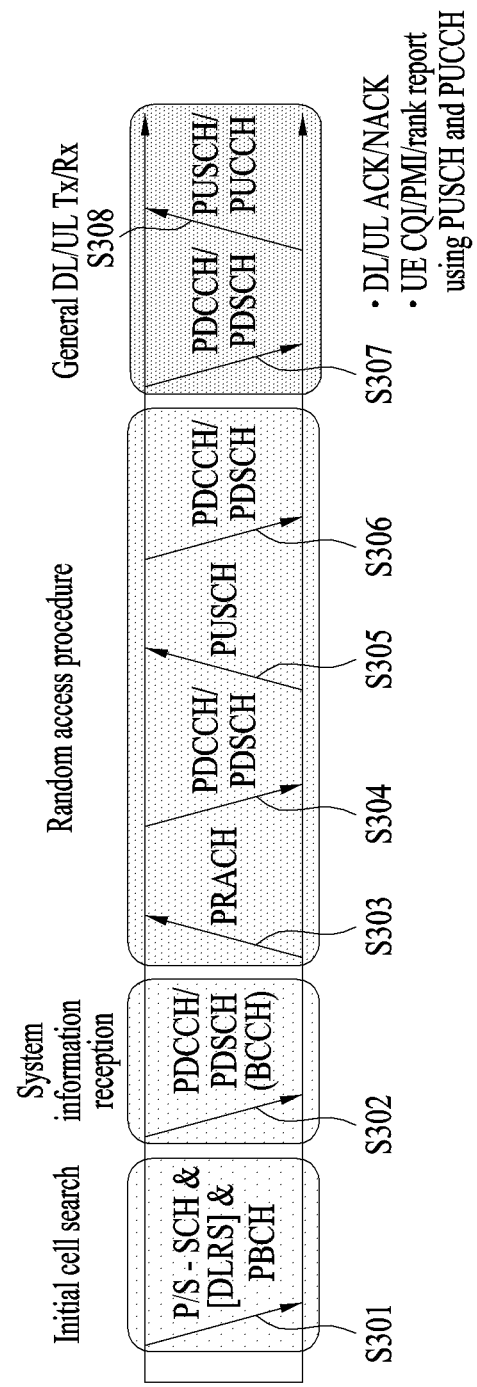
FIG. 3 is a diagram showing physical channels used in a 3GPP system and a general signal transmission method using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303] and is then able to receive a response message via PDCCH and a corresponding PDSCH in response to the preamble [S304]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
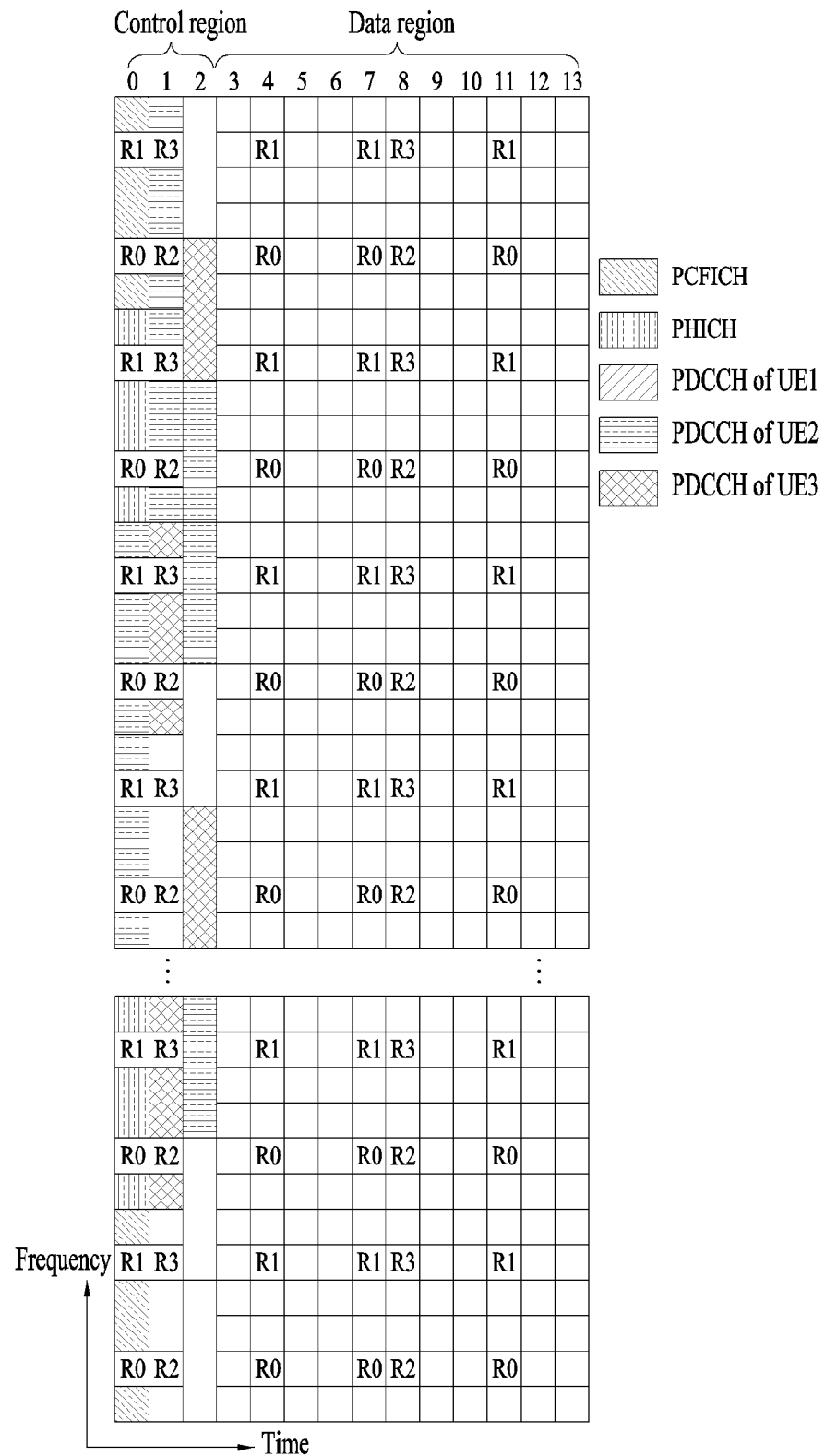
FIG. 4 is a diagram showing the structure of a downlink radio frame used in a Long Term Evolution (LTE) system.

FIG. 4 is a diagram for one example of a structure of a downlink (DL) subframe used by LTE system.

Referring to FIG. 4, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 5:
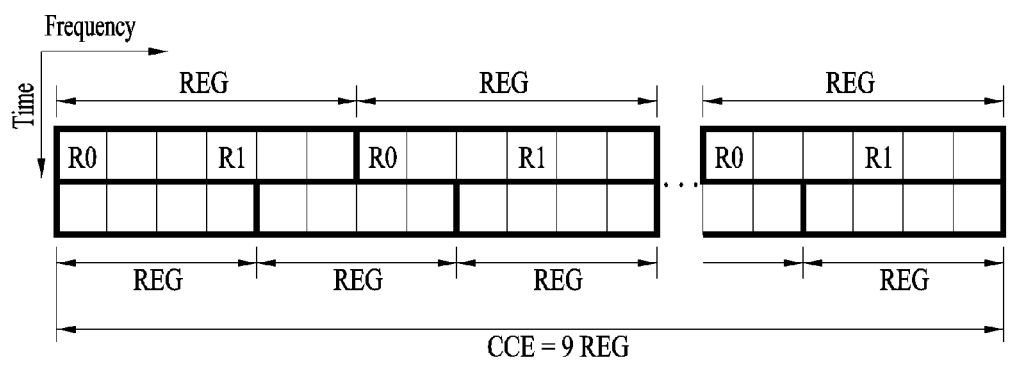
FIG. 5 is a diagram of a resource unit used in configuring a control channel.
Figure 5:
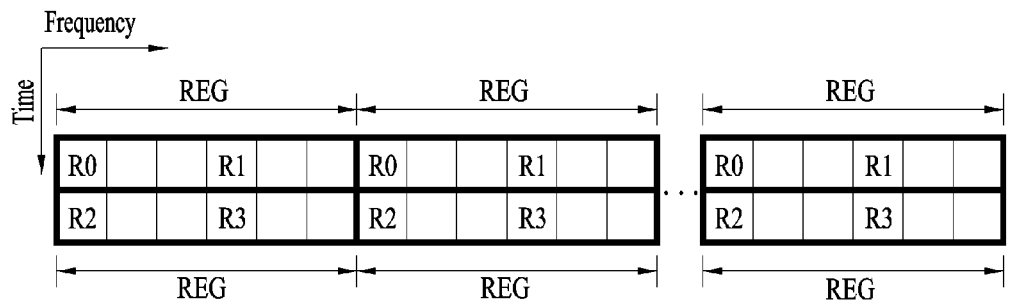

FIG. 5 is a diagram of a resource unit used in configuring a control channel. In particular, FIG. 5 (a) shows a case that the number of transmitting antennas of a base station is 1 or 2. And, FIG. 5 (b) shows a case that the number of transmitting antennas of a base station is 4. The case shown in FIG. 5 (a) only differs from each other in RS (reference signal) pattern but have the same method of configuring a resource unit related to a control channel.

Referring to FIG. 5, a basic resource unit of a control channel is REG. The REG includes 4 neighboring resource elements (REs) except RS. The REG is indicated by a bold line in the drawing. PCFICH and PHICH include 4 REGs and 3 REGs, respectively. PDCCH is configured by CCE (control channel elements) unit and one CCE includes 9 REGs.

A user equipment is set to check $M^{(L)}$ ($\geq L$) CCEs, which are contiguous to each other or arranged by specific rules, in order to check whether PDCCH configured with L CCEs is transmitted to the corresponding user equipment. The L value, which should be considered by the user equipment for PDCCH reception, may become a plural number. CCE sets, which should be checked by the user equipment for the PDCCH reception, are called a search space. For instance, LTE system defines a search space as Table 1.

TABLE 1

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, CCE aggregation level L indicates the number of CCEs configuring PDCCH, $S_k^{(L)}$ indicates a search space of the CCE aggregation level L, and $M^{(L)}$ indicates the number of PDCCH candidates supposed to be monitored in the search space of the aggregation level L.

The search space may be categorized into a UE-specific search space granting an access to a specific user equipment only and a common search space granting accesses to all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap with each other.

A position of a $1^{st}$ CCE (i.e., CCE having a smallest index) in PDCCH search space given to a random user equipment for each CCE aggregation level value may vary in each subframe according to a user equipment. This may be called a PDCCH search space hashing.

A plurality of CCEs logically contiguous to one another are inputted to an interleaver. In this case, the interleaver plays a role in mixing a plurality of the inputted CCEs by REG unit. Hence, frequency/time resources constructing one CCE are distributed in a manner of being physically scattered on a whole frequency/time domain within a control region of a subframe. Although a control channel is configured by CCE unit, interleaving is performed by the REG unit. Therefore, it may be able to maximize frequency diversity and interference randomization gain. A detailed method for designating a search space will be described later.

Figure 6:
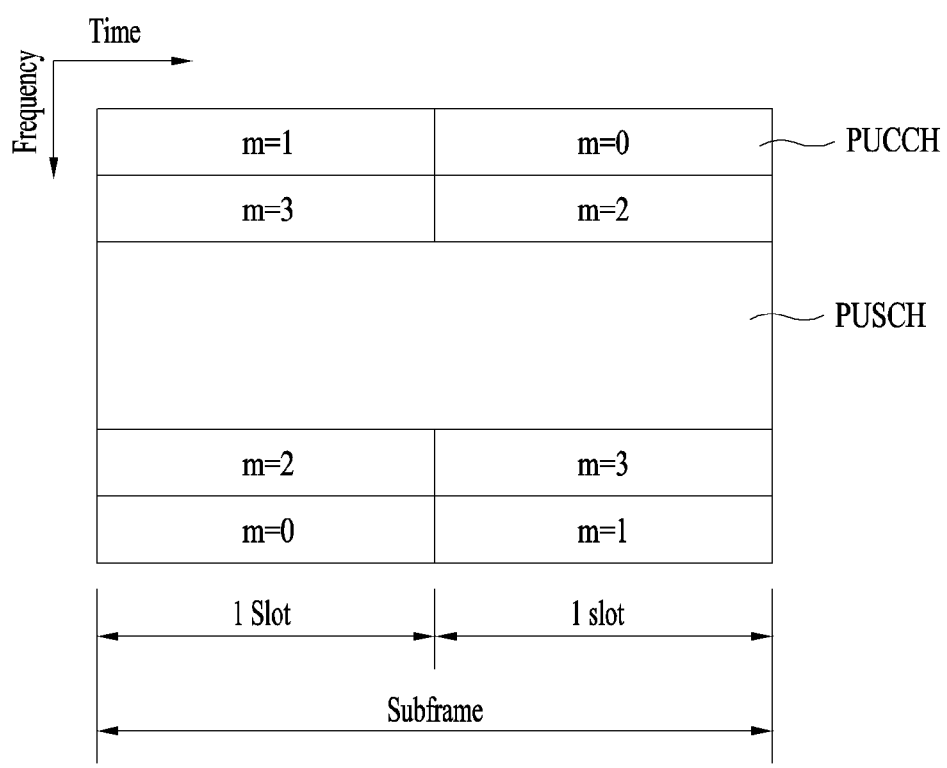
FIG. 6 is a diagram of one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

Figure 7:
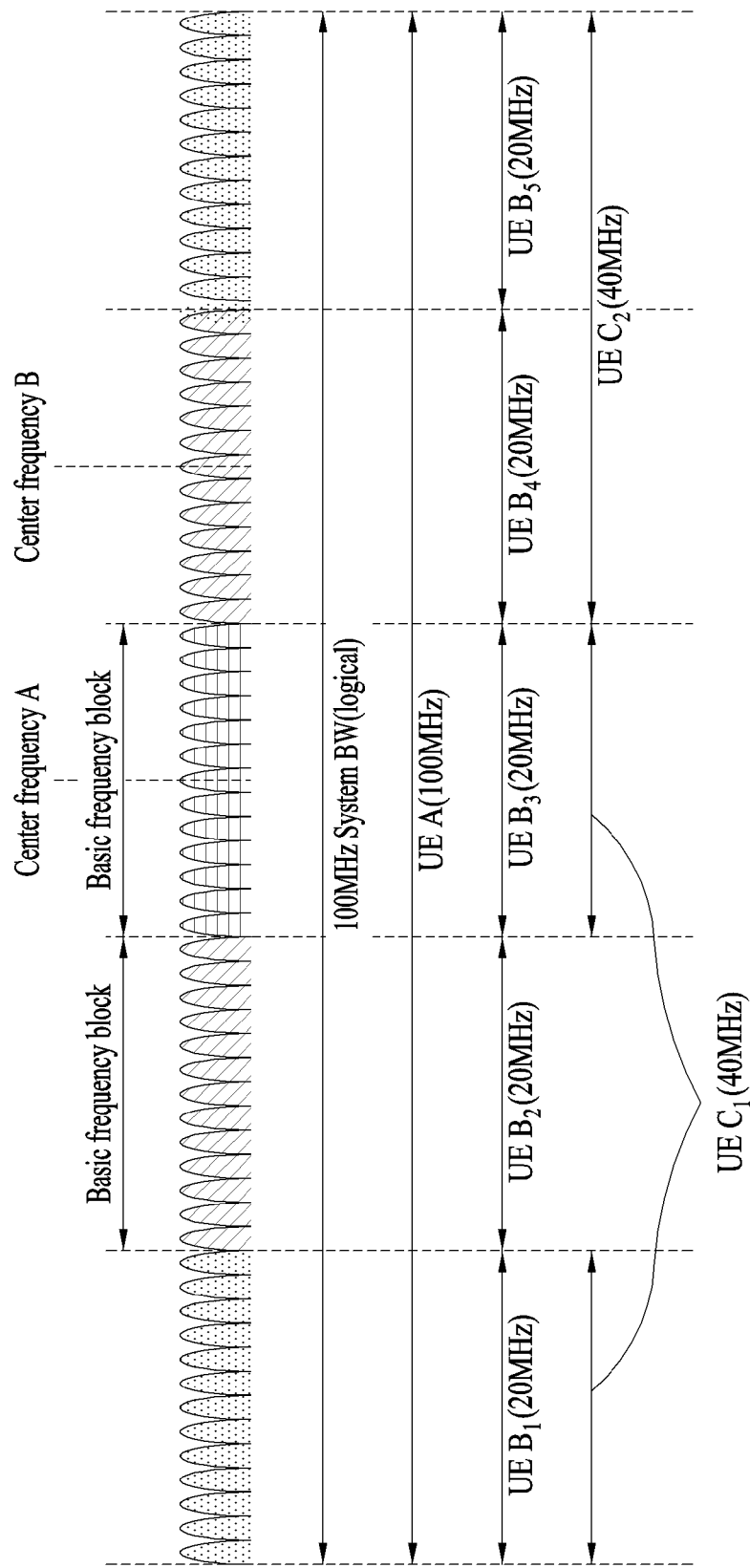
FIG. 7 is a diagram for a concept to describe a carrier aggregation scheme.

FIG. 7 is a diagram for a concept to describe a carrier aggregation scheme.

Carrier aggregation means a method for a user equipment to use one wide logical frequency band using a plurality of frequency blocks or cells (in the logical meaning) configured with uplink resources (or component carriers) and/or downlink resources (or component carriers) in order for a wireless communication system to use a wider frequency band. For clarity of the following description, such a terminology as a component carrier shall be uniformly used.

Referring to FIG. 7, a full system bandwidth (BW) is a logical band and has maximum 100 MHz of bandwidth. The full system bandwidth includes 5 component carriers. And, each of the component carriers has maximum 20 MHz of bandwidth. The component carrier includes at least one contiguous subcarrier that is physically contiguous. Although FIG. 7 shows that each of the component carriers has the same bandwidth for example, each of the component carriers can have a different bandwidth. In the drawing, the component carriers are adjacent to each other in frequency domain. Yet, the drawing is attributed to the logical concept. Hence, the component carriers may be physically adjacent to each other or may be spaced apart from each other.

A different center frequency may be used for each component carrier. Alternatively, one common center frequency may be used for component carriers physically adjacent to each other. For instance, in FIG. 7, assuming that all component carriers are physically adjacent to each other, it is able to use a center frequency A. Assuming that component carriers are not physically adjacent to each other, it is able to separately use a center frequency A, a center frequency B or the like for each component carrier.

In the present specification, a component carrier may correspond to a system bandwidth of a legacy system. If a component carrier is defined with reference to a legacy system, backward compatibility offering and system design can be facilitated in a wireless communication environment in which an advanced user equipment and a legacy user equipment coexist.

In case that a full system bandwidth is extended by carrier aggregation, a frequency band used for a communication with each user equipment (UE) is defined by component carrier unit. UE A can use a full system band 100 MHz and performs a communication using all of 5 component carriers. Each of UE $B_1$ to UE $B_5$ can use 20 MHz bandwidth only and perform a communication using one component carrier. Each of UE C1 and UE C2 can use 40 MHz bandwidth and perform a communication two component carriers. In this case, the two component carriers may be logically/physically adjacent to each other or may not. The UE $C_1$ shows a case of using two component carriers no adjacent to each other. And, the UE C2 shows a case of using two component carriers adjacent to each other.

In case of LTE system, one DL component carrier and one UL component carrier are used. On the other hand, in case of LTE-A system, several component carriers are usable as shown in FIG. 7. In doing so, schemes for a control channel to schedule a data channel can be categorized into a linked carrier scheduling scheme of the related art and a cross carrier scheduling scheme.

In particular, according to the linked carrier scheduling, like the legacy LTE system that uses a single component carrier, a control channel transmitted on a specific component carrier only schedules a data channel through the specific component carrier.

On the other hand, according to the cross scheduling, a control channel transmitted on a primary component carrier (Primary CC) schedules a data channel, which is transmitted on the primary component carrier or another component carrier, using a carrier indicator field (CIF).

Figure 8:
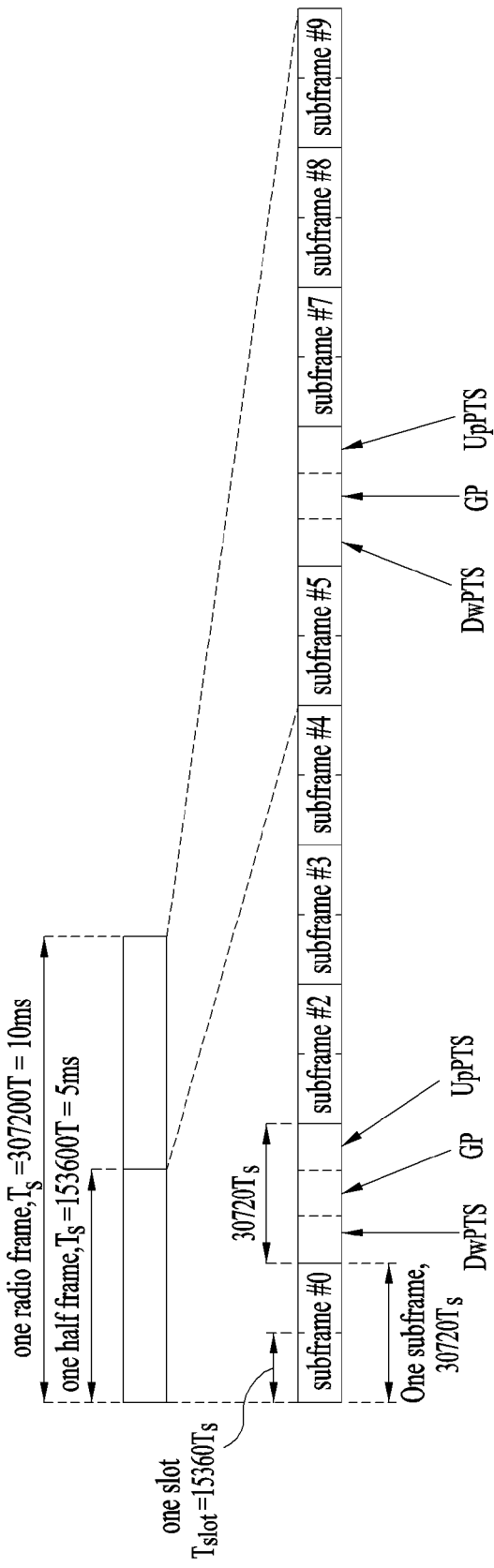
FIG. 8 illustrates a structure of a radio frame in an LTE TDD system.

FIG. 8 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

In an LTD TDD system, the special subframe is defined as a total of 10 configurations as shown in Table 2.

TABLE 2

| | | Normal cyclic prefix in downlink | | | | |
|---|---|---|---|---|---|---|
| | | UpPTS | | | Extended cyclic prefix in downlink | |
| | | Normal | Extended | | UpPTS | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, in an LTE TDD system, a UL/DL configuration is shown in Table 3 below.

TABLE 3

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3 above, D, U, and S refer to a downlink subframe, an uplink subframe, and the special subframe. In addition, Table 3 also shows downlink-to-uplink switch-point periodicity in an uplink/downlink subframe configuration in each system.

In the current wireless communication environment, data throughput for a cellular network is rapidly increasing with the emergence and propagation of various devices requiring M2M (machine-to-machine) communication and high data throughput. To meet high data throughput, communication technology evolves to carrier aggregation for enabling efficient use of a larger number of frequency bands, MIMO for increasing data capacity within a limited frequency band, and coordinated multi-point (CoMP) and communication environments evolves to environments in which the density of accessible nodes around a UE increases. A system having high-density nodes can show higher system performance according to cooperation among nodes. This scheme provides much higher performance than a scheme in which nodes operate as independent base stations (BSs) (which may be called advanced BSs (ABSs), Node-Bs (NBs), eNode-Bs (eNBs), access points (APs), etc.).

Figure 9:
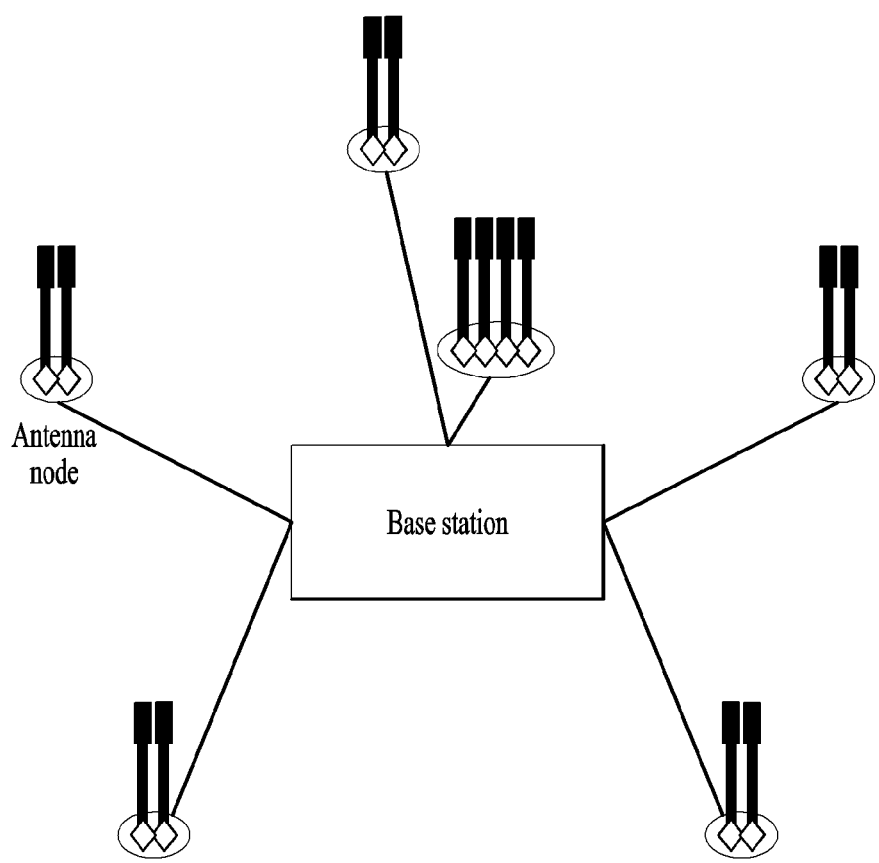
FIG. 9 illustrates a multi-node system from among next-generation communication systems.

FIG. 9 illustrates a multi-node system from among next-generation communication systems.

Referring to FIG. 9, when transmission and reception of all nodes are managed by one controller and thus the nodes operates as an antenna group of one cell, the system can be regarded as a distributed multi-node system (DMNS) which forms one cell. The individual nodes may be assigned respective node IDs or may operate as antennas in the cell without having node IDs. However, if the nodes have different cell identifiers IDs, then the system can be regarded as a multi-cell system. When multiple cells are configured in an overlapping manner according to coverage, this is called a multi-tier network.

A Node-B, eNode-B, PeNB, HeNB, RRH (Remote Radio Head), relay and distributed antenna can be a node and at least one antenna is installed in one node. A node may be called a transmission point. While nodes generally refer to a group of antennas spaced by a predetermined distance or more, nodes can be applied to the present invention even if the nodes are defined as an arbitrary antenna group irrespective of distance.

With the introduction of the aforementioned multi-node system and relay nodes, various communication schemes can be applied to improve channel quality. To apply MIMO and CoMP to multi-node environments, however, introduction of a new control channel is needed. Accordingly, an enhanced PDCCH (EPDCCH) is newly introduced as a control channel. The EPDCCH is allocated to the data region (referred to as a PDSCH region hereinafter) instead of the control region (referred to as a PDCCH region). Since control information about a node can be transmitted to each UE through the EPDCCH, PDCCH region shortage can be solved. For reference, the EPDCCH is not provided to legacy UEs and can be received only by LTE-A UEs. In addition, the EPDCCH is transmitted and received on the basis of a DM-RS (or CSI-RS) instead of a CRS corresponding to a cell-specific reference signal.

Figure 10:
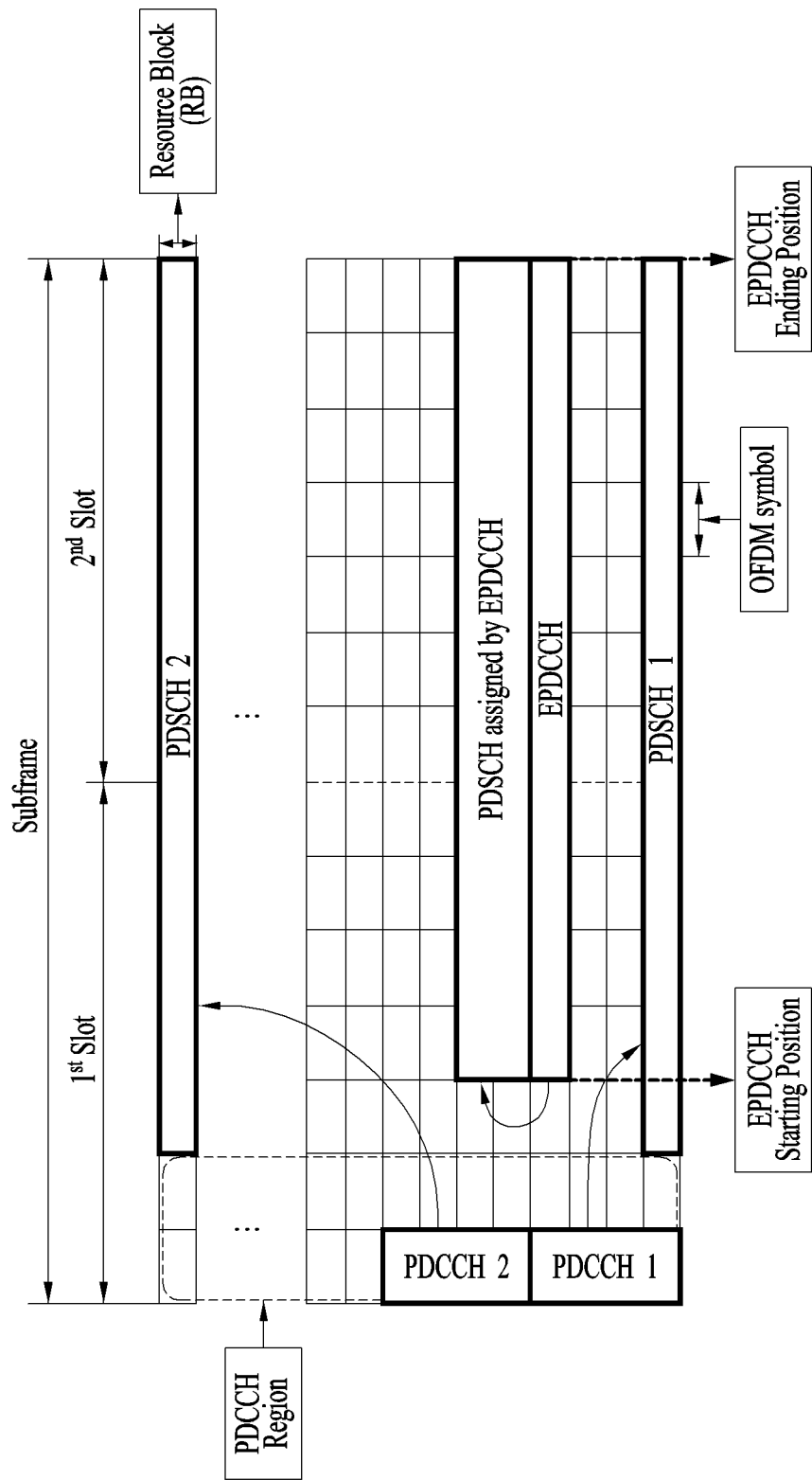
FIG. 10 illustrates an EPDCCH and a PDSCH scheduled by the EPDCCH.

FIG. 10 illustrates an example of an EPDCCH and a PDSCH scheduled by the EPDCCH.

Referring to FIG. 10, PDCCH 1 and PDCCH 2 respectively schedule PDSCH 1 and PDSCH 2 and the EPDCCH schedules another PDSCH. FIG. 10 shows that the EPDCCH is transmitted, starting from the fourth symbol of the corresponding subframe to the last symbol.

EPDCCHs can be transmitted through the PDSCH region used to transmit data and a UE monitors EPDCCHs in order to detect presence or absence of an EPDCCH destined therefor. That is, to obtain DCI included in the EPDCCH, the UE needs to perform blind decoding for a predetermined number of EPDCCH candidates in a search space with aggregation level L. Like the aggregation level of the search space for the PDCCH, the aggregation level of the search space for the EPDCCH refers to the number of enhanced CCE (ECCEs) used to transmit DCI.

An eNB may define a plurality of types of carriers. One of the carrier types is a carrier which was defined when 3GPP LTE was initially designed and carries a cell-specific reference signal (CRS) in at least part of front OFDM symbols of all subframes over the entire band. For convenience, this carrier is called a legacy carrier type (LCT). Another carrier type is a carrier which carries the CRS only in part of subframes and/or part of frequency resources, differently from the LCT, and is called a new carrier type (NCT). In the case of the NCT, the CRS is used only for synchronization acquisition and may not be used for channel demodulation.

Figure 11:
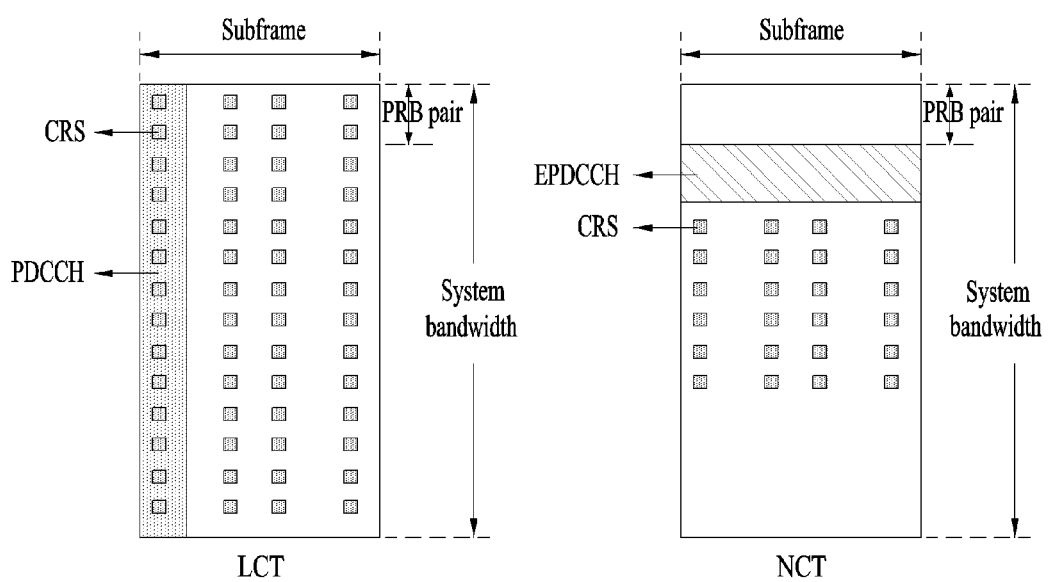
FIG. 11 illustrates comparison of an LCT subframe structure and an NCT subframe structure.

FIG. 11 illustrates comparison of an LCT subframe structure and an NCT subframe structure. Particularly, it is assumed that the LCT uses the legacy PDCCH and the NCT uses the EPDCCH for downlink control in FIG. 11.

A description will be given of a method for designating the position of a PDCCH candidate and the position of an EPDCCH candidate in a search space.

The number of CCEs configured in a predetermined subframe k is defined as $N_{CCE,k}$ and indices of the CCEs are 0 to $N_{CCE,k}-1$. In this case, 3GPP defines the position of a PDCCH candidate m=0, . . . , $M^{(L)}-1$ of a corresponding aggregation level L in a search space $S_k^{(L)}$ (L∈{1,2,4,8}) as represented by Expression 1.

$$L\{(Y_k+m') \bmod \lfloor N_{CCE,k}/L \rfloor\}+i \qquad \text{[Expression 1]}$$

In Expression 1, m' is set such that m'=m in the case of a common search space. Even in the case of a UE-specific search space, m' is set such that m'=m if the CIF is not defined, that is, cross carrier scheduling is not applied. Conversely, when the CIF is defined, that is, cross carrier scheduling is applied in the case of the UE-specific search space, m' is set such that m=m+$M^{(L)} \cdot n_{CI}$. Here, $n_{CI}$ indicates a CIF value.

In the case of the common search space, $Y_k$ is set to 0. In the case of the UE-specific search space, $Y_k$ may be defined according to a hashing function as represented by Expression 2.

$$Y_k=(A \cdot Y_{k-1}) \bmod D \qquad \text{[Expression 2]}$$

In Expression 2, A=39827 and D=65537. In addition, k=$\lfloor n_s/2 \rfloor$ and $n_s$ indicates a slot index in one radio frame. Furthermore, an initial value may be set such that $Y_{-1}=n_{RNTI} \neq 0$, and $n_{RNTI}$ represents a UE ID.

A resource region of an EPDCCH is divided into a plurality of ECCEs. When $M_p^{(L)}$ EPDCCH candidates at an aggregation level $M_p^{(L)}$ are defined in the subframe k and EPDCCH set p, the index of an ECCE that constitutes an m-th EPDCCH candidate for a carrier index $n_{CI}$ is determined by Expression 3. In Expression 3, $Y_{k,p}$ is determined as being identical to $Y_k$ of Expression 2 and A or D may be determined as a different value according to EPDCCH set p.

$$L\left\{\left(Y_{k,p}+n_{CI}+\left\lfloor\frac{N_{CCE,k,p}}{L \cdot M_p^{(L)}}m\right\rfloor\right) \bmod \lfloor N_{CCE,k,p}/L \rfloor\right\}+i \qquad \text{[Expression 3]}$$

As a new communication scheme is introduced to LTE, DCI for a plurality of subframes needs to be transmitted in one subframe. Operation of transmitting DCI for a plurality of subframes through one subframe may be referred to as multi-subframe scheduling or cross-subframe scheduling.

Such multi-subframe scheduling is required in a case in which a larger number of subframes are configured for uplink in uplink/downlink subframe configurations of a TDD system. For example, multi-subframe scheduling can be used when only two of ten subframes that constitute one radio frame are configured as downlink subframes and the remaining eight subframes are configured as uplink subframes and thus uplink traffic is considerably large. In this case, multi-subframe scheduling for transmitting DCI for four uplink subframes through one downlink subframe occurs.

Figure 12:
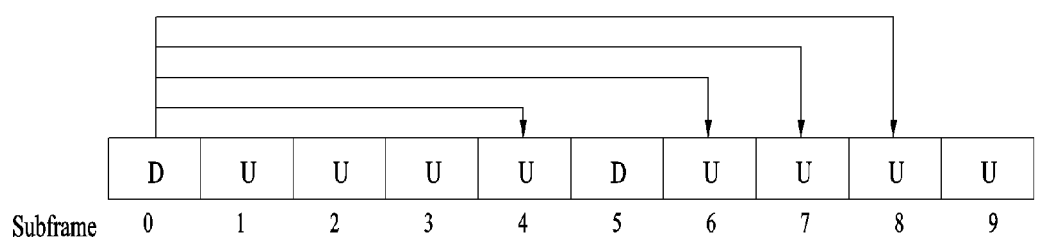
FIG. 12 illustrates an example of multi-subframe scheduling.

FIG. 12 illustrates an example of multi-subframe scheduling.

FIG. 12 shows a case in which, to secure a processing time between transmission of an uplink grant included in DCI and transmission of a PUSCH corresponding to the uplink grant, the uplink grant transmitted in subframe #0 chedules four uplink subframes #4, #6, #7 and #8 appearing 4 ms after from subframe #0. Here, it is possible to use the existing uplink/downlink subframe configuration #defined as two downlink subframes, two special subframes and six uplink subframe while setting a very long UpPTS in the special subframes, instead of newly defining an uplink/downlink subframe configuration including two downlink subframes and eight uplink subframes, thereby achieving the same effect.

Figure 13:
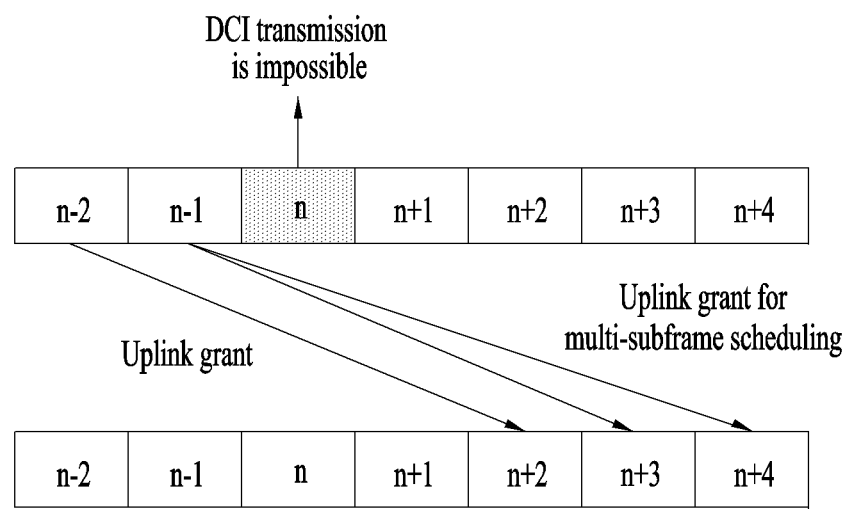
FIG. 13 illustrates another example of multi-subframe scheduling.

In addition, multi-subframe scheduling is required in a case in which DCI transmission cannot be performed in a specific downlink subframe. For example, when DCI cannot be transmitted in subframe #n, operation of a subframe scheduled by DCI transmitted in subframe #n cannot be defined and thus the operation is defined by transmitting the DCI in another subframe. Specifically, if DCI transmission is impossible in subframe #n when an uplink grant in subframe #n schedules PUSCH transmission in subframe #n+4, the uplink grant for subframe #n+4 can be transmitted in subframe #n−1 in which DCI transmission is possible. Here, subframe #n−1 may also be used to transmit an uplink grant for subframe #n+3. FIG. 13 illustrates another example of multi-subframe scheduling.

DCI transmission may be impossible in subframe #n shown in FIG. 13 for various reasons including the following cases 1) to 7).

1) Case in which severe inter-cell interference is generated in the corresponding subframe and thus stable DCI detection is impossible 2) Case in which physical multicast channels (PMCHs) or positioning reference signals (PRSs) are simultaneously transmitted by a plurality of cells in the corresponding subframe over a broad band and thus resources used for DCI transmission are not present, particularly, a case in which EPDCCH transmission resources are occupied by PMCH or PRS transmission when the NCT uses the EPDCCH 3) Case in which a cyclic prefix (CP) having a different length from that of a conventional subframe is used when a signal such as a PMCH or RPS is transmitted in the corresponding subframe and thus a UE that performs operation of maintaining the CP of the conventional subframe cannot receive DCI in the corresponding subframe, particularly, a case in which the EPDCCH uses the normal CP but the PMCH or PRS uses the extended CP when the NCT uses the EPDCCH and thus the EPDCCH and the PMCH or PRS cannot be simultaneously transmitted in one subframe.

4) Case in which the corresponding subframe is a special subframe and cannot be used to transmit a control channel because of a very small amount of resource for downlink transmission, particularly, a case in which the EPDCCH cannot be transmitted because of special subframe configurations #0 and #5 with the normal CP or special subframe configurations #0 and #4 with the extended CP in the NCT using the EPDCCH 5) Case in which a DM RS for the EPDCCH cannot be defined in the corresponding subframe and thus the EPDCCH cannot be transmitted, particularly, a case in which the DM RS is not correctly present in the region of a DwPTS due to special subframe configuration #7 with the extended CP and thus EPDCCH transmission is impossible 6) Case in which signals that need to be commonly received by all UEs, such as PSS/SSS/PBCH/SIB/paging, are transmitted in some or all frequency regions of the corresponding subframe but resources for configuring the EPDCCH by avoiding the frequency regions are insufficient or control channel reliability is remarkably deteriorated when the same frequency resource is used, for example, a case in which resources for EPDCCH transmission are not present after transmission of the PSS/SSS/PBCH or a DM RS for the EPDCCH is damaged and thus reliable reception is impossible, due to a narrow system bandwidth 7) Other cases including a case in which an eNB notifies UEs that DCI transmission is impossible in the corresponding subframe through a higher layer signal such as an RRC signal upon determining that DCI transmission is impossible in the corresponding subframe In FIGS. 12 and 13, scheduling for multiple subframes, particularly, uplink grant transmission for multiple subframes is performed in one subframe. Furthermore, an uplink subframe appears after multi-subframe scheduling in FIG. 12 and a subframe in which DCI is not transmitted appears after multi-subframe scheduling in FIG. 13, and thus DCI is not transmitted in the subframe following the subframe in which multi-subframe scheduling is performed in both cases of FIGS. 12 and 13.

The present invention proposes a method for setting a search space in which a UE monitors DCI, that is, performs blind decoding, on the basis of DCI decoding priority. Particularly, the present invention proposes a method for setting a search space on the basis of whether DCI needs to be immediately handled by a UE or need not be immediately handled by the UE at a time around multi-subframe scheduling during multi-subframe scheduling.

The methods proposed by the present invention will now be described in detail. It is assumed that multi-subframe scheduling is performed in subframe #n−1 and DCI is not transmitted in subframe #n. However, it is apparent that the present invention is applicable to a normal case in which multi-subframe scheduling is performed in multiple subframes, subframes in which DCI is not transmitted consecutively appear or a subframe in which DCI can be transmitted is present between a subframe in which multi-subframe scheduling is performed and a subframe in which DCI is not transmitted.

In a subframe in which multi-subframe scheduling is performed, a search space for additional DCI transmission is additionally configured in a conventional search space. That is, the number of PDCCH candidates (or EPDCCH candidates) increases in the subframe in which multi-subframe scheduling is performed, compared to other subframes.

According to this method, it is possible to overcome a problem that search spaces overlap between UEs and thus DCI cannot be transmitted by securing a sufficient search space such that a plurality of pieces of DCI corresponding to a plurality of subframes can be transmitted in one subframe. However, when a search space increases in one subframe, the number of DCI candidates that needs to be monitored by a UE within a unit time increases and thus calculation complexity of the UE and battery consumption also increase.

Such problem can be solved by transmitting only DCI that need not be immediately detected in the additional search space. That is, the UE attempts DCI detection only for the conventional search space in the subframe in which multi-subframe scheduling is performed and attempts DCI detection for the additional search space in the next subframe using a time in which DCI is not transmitted while maintaining the number of detected pieces of DCI within the unit time.

Figure 14:
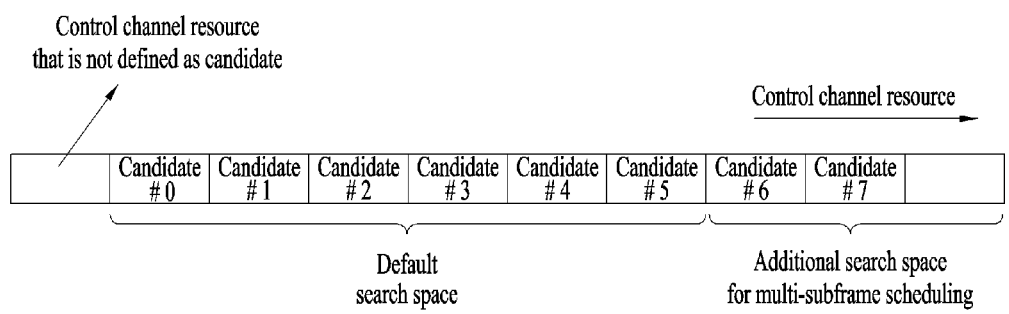
FIG. 14 illustrates an exemplary search space configuration according to an embodiment of the present invention.

FIG. 14 illustrates an exemplary search space configuration according to an embodiment of the present invention. Particularly, FIG. 14 illustrates an exemplary search space in subframe #n−1 of FIG. 13 and shows positions of PDCCH candidates (or EPDCCH candidates) on which DCI may be transmitted to a UE on the entire control channel resources. FIG. 14 shows logical resource indices for convenience of description.

Referring to FIG. 14, in candidates #0 to #5, a search space is configured in the same manner as the manner in which multi-subframe scheduling is not performed. In FIG. 14, it is assumed that six candidates are defined in one subframe when multi-subframe scheduling is not performed and the six candidates are referred to as a default search space. In such default search space, DCI that needs to be rapidly handled by the UE, that is, DCI relatively close to a subframe in which the UE performs corresponding operation. In FIG. 13, for example, the DCI is related to an uplink grant for a PUSCH in subframe #n+3 and/or downlink assignment for a PDSCH in subframe #n−1 and HARQ-ACK transmission in subframe #n+3 corresponding thereto.

It can be seen from FIG. 14 that two candidates #6 and #7 are added for multi-subframe scheduling. These two candidates #6 and #7 are referred to as an additional search space. The additional search space can be used only to transmit DCI that need not be rapidly handled by the UE. For example, in FIG. 13, the DCI is related to an uplink grant for a PUSCH in subframe #n+4 and/or downlink assignment for a PDSCH in subframe #n and HARQ-ACK transmission in subframe #n+4 corresponding thereto in the case of subframe #n−1.

When the search spaces are set as shown in FIG. 14, the UE prepares operation in subframe #n+3 by decoding the six candidates corresponding to the default search space in subframe #n−1 on the assumption that the UE maintains the capability to decode six candidates per subframe. Since DCI is not transmitted in subframe #n, the UE prepares operation in subframe #n+4 by decoding the two candidates present in the additional search space by reusing a DCI decoding circuit for the time corresponding to subframe #n.

Figure 15:
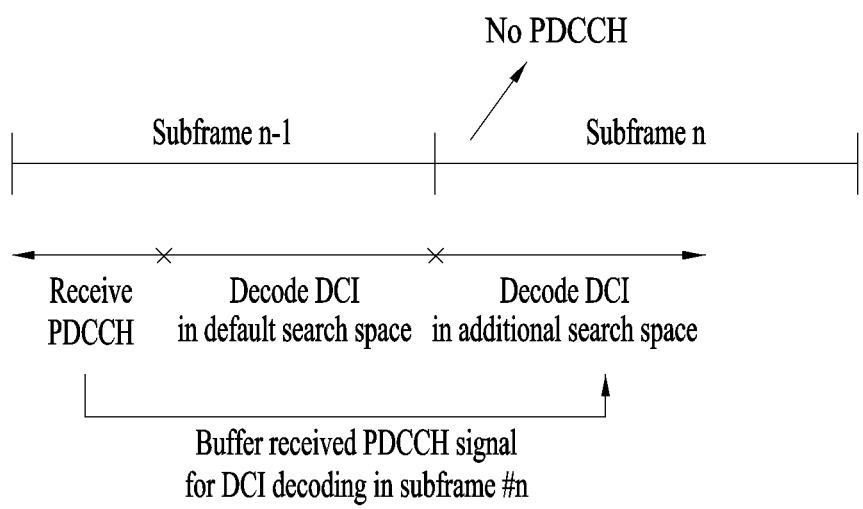
FIGS. 15 and 16 illustrate operation of the UE when search spaces are configured according to embodiments of the present invention.
Figure 16:
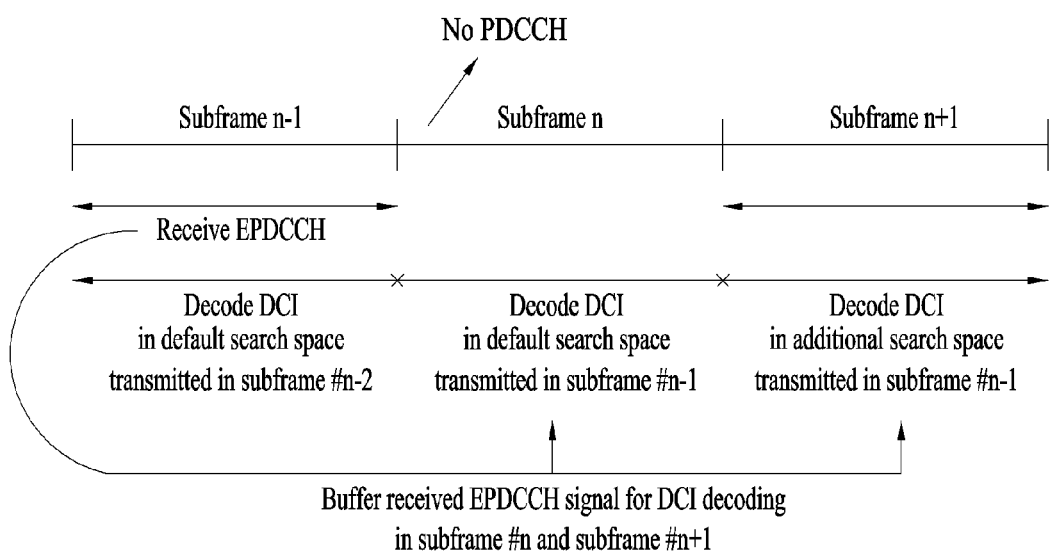

FIGS. 15 and 16 illustrate operation of the UE when search spaces are configured according to embodiments of the present invention.

FIG. 15 shows operation of decoding a PDCCH. In FIG. 15, blind decoding is performed on a PDCCH, which is received in one subframe, in a default search space. It is assumed that blind decoding can be completed in the corresponding subframe. FIG. 16 illustrates operation of decoding an EPDCCH. In FIG. 16, blind decoding is performed on an EPDCCH, which is received in one subframe, in a default search space in the next subframe. It is assumed that blind decoding can be completed in the next subframe.

Search space configuration shown in FIG. 14 is described according to operation in subframe #0 of FIG. 12. An uplink grant for a PUSCH in subframes #4 and #6 and/or information on downlink assignment for a PDSCH in subframe #0 are transmitted using the candidates of the default search space, whereas an uplink grant for a PUSCH in subframes #7 and #8 is transmitted using candidates corresponding to the additional search space. In this case, even when the additional search space is blind decoded in the next uplink subframe, there is no problem in uplink transmission of the UE, which corresponds to the uplink grant.

As described above, the additional search space in the subframe in which multi-subframe scheduling is performed is used to transmit DCI that need not be immediately handled. Such DCI includes an uplink grant for a PUSCH in a subframe at a distance from the corresponding subframe. In addition, such DCI may include information on downlink assignment for a PDSCH in a subframe at a distance from the corresponding subframe, for example, information on downlink assignment for a PDSCH in a subframe following the subframe in which multi-subframe scheduling is performed.

The DCI that need not be immediately handled may be transmitted in the default search space according to circumstances. For example, an uplink grant for a PUSCH in subframe #n+4 is transmitted using one of the candidates of the default search space of FIG. 14 in subframe #n−1 of FIG. 13. Such operation can be used when urgent DCI need not be transmitted to a specific UE at multi-subframe scheduling timing. Particularly, the additional search space can be used for DCI transmission for another UE.

To this end, it is necessary to indicate a subframe corresponding to operation indicated by the DCI transmitted in the default search space. This can be implemented by adding an indicator indicating the subframe to the DCI or the DCI is masked using an RNTI related to the subframe. When the indicator indicating the subframe is added to the DCI transmitted in the default search space, DCI transmitted in the additional search space does not include the indicator or is fixed to a specific state in which all bits are set to 0 so as to reduce the probability that the UE wrongly determines that the DCI has been successfully detected.

While the candidates of the default search space and the candidates of the additional search space can be composed of consecutive control channel resources, the candidates may be configured in such a manner that the candidates are arranged according to a predetermined rule and repeatedly appear. In this case, it is possible to prevent a specific candidate from being concentrated on a specific resource region to restrict frequency selective transmission.

Figure 17:
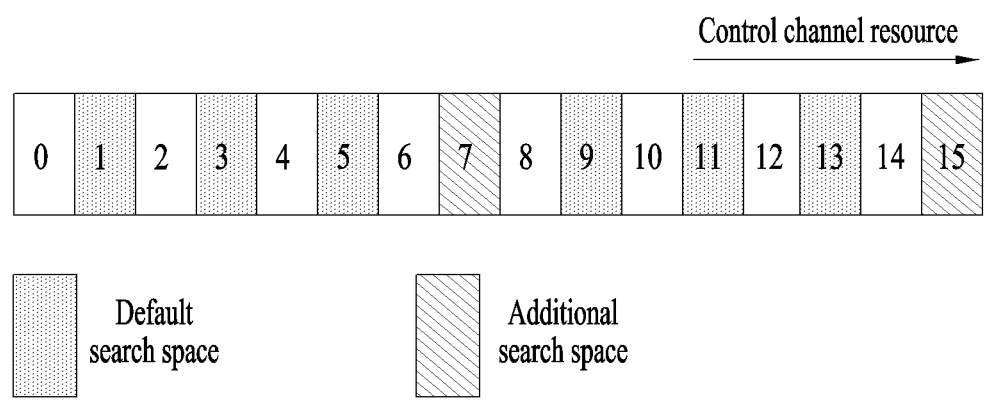
FIG. 17 illustrates another example of search space configuration according to an embodiment of the present invention.

FIG. 17 illustrates another example of search space configuration according to an embodiment of the present invention.

Particularly, FIG. 17 shows a case in which 16 pieces of DCI from among all control channel resources can be transmitted, six candidates constitute a default search space and two candidates constitute an additional search space. Specifically, candidates #1, #3, #5, #9, #11 and #13 constitute the default search space and candidates #7 and #15 constitute the additional search space. That is, three candidates corresponding to the default search space are disposed and then followed by one candidate corresponding to the additional search space with an interval corresponding to one control channel resource provided between candidates such that all candidates are evenly distributed over the entire control channel resource region.

Such configuration can be achieved using Expression 3 of calculating the index of an ECCE constituting an EPDCCH candidate.

For example, the total number of candidates, $M_p^{(L)}$, is set to the sum of the number $M_{A,p}^{(L)}$ of candidates of the default search space and the number $M_{B,p}^{(L)}$ of candidates of the additional search space and default search space candidates are discriminated from additional search space candidates by candidate index m during a process of changing m from 0 to $M_p^{(L)}-1$. That is, in Expression 3, $M_p^{(L)}$ is set such that $M_p^{(L)}=M_{A,p}^{(L)}+M_{B,p}^{(L)}$ and a candidate corresponding to $m=t*(M_{A,p}^{(L)}+M_{B,p}^{(L)})/M_{B,p}^{(L)}-1$ (t=1, 2, ..., $M_{B,p}^{(L)}$) is set to an additional search space candidate.

Alternatively, the candidates of the default search space and the candidates of the additional search space are respectively derived using separate expressions by setting $M_p^{(L)}$ to $M_{A,p}^{(L)}$ and $M_{B,p}^{(L)}$. In this case, the candidates of one of the two search spaces may be given a predetermined offset in order to prevent the same candidate from constituting both the search spaces. For example, in the case of the additional search space, a specific numeral such as 1 is added to $Y_{k,p}$ such that candidates are configured at positions other than the default search space. Alternatively, the parameter A or D used to generate $Y_{k,p}$ may be set to a value different from that of the default search space.

Figure 18:
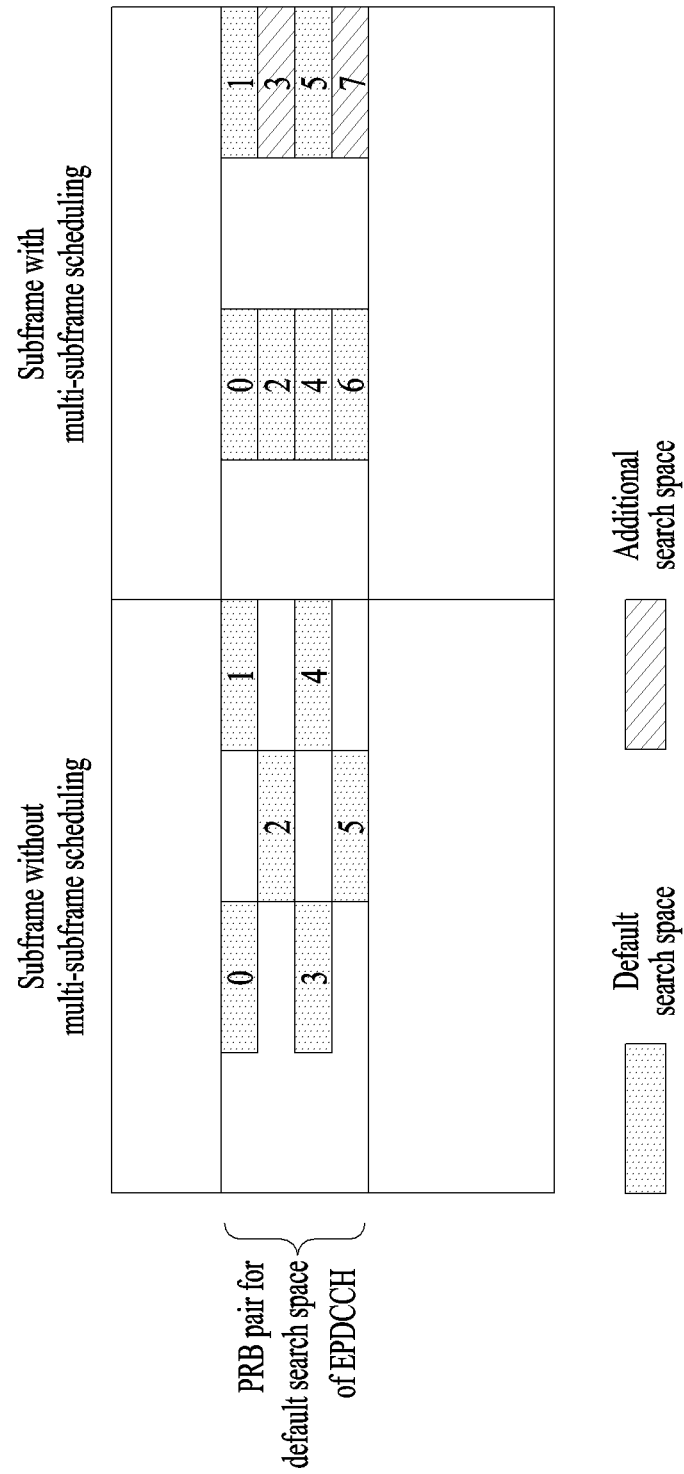
FIGS. 18 to 20 illustrate exemplary EPDCCH candidates according to embodiments of the present invention.
Figure 19:
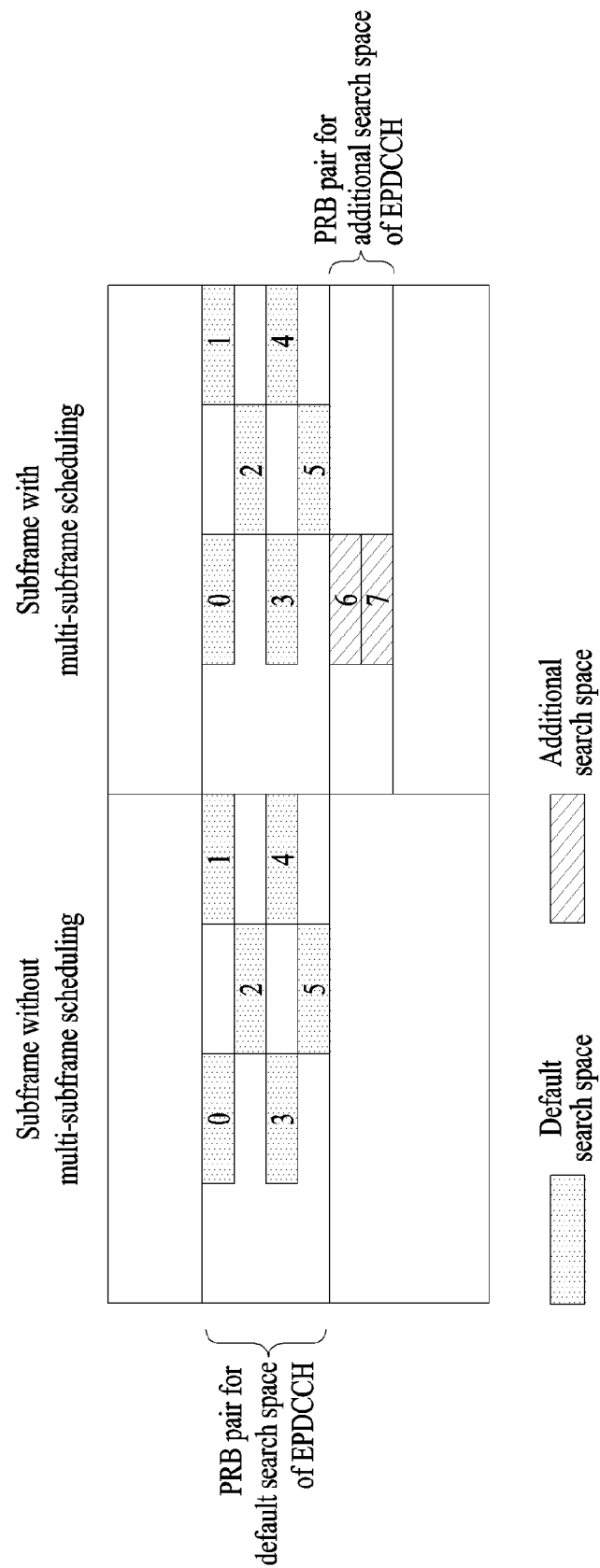
Figure 20:
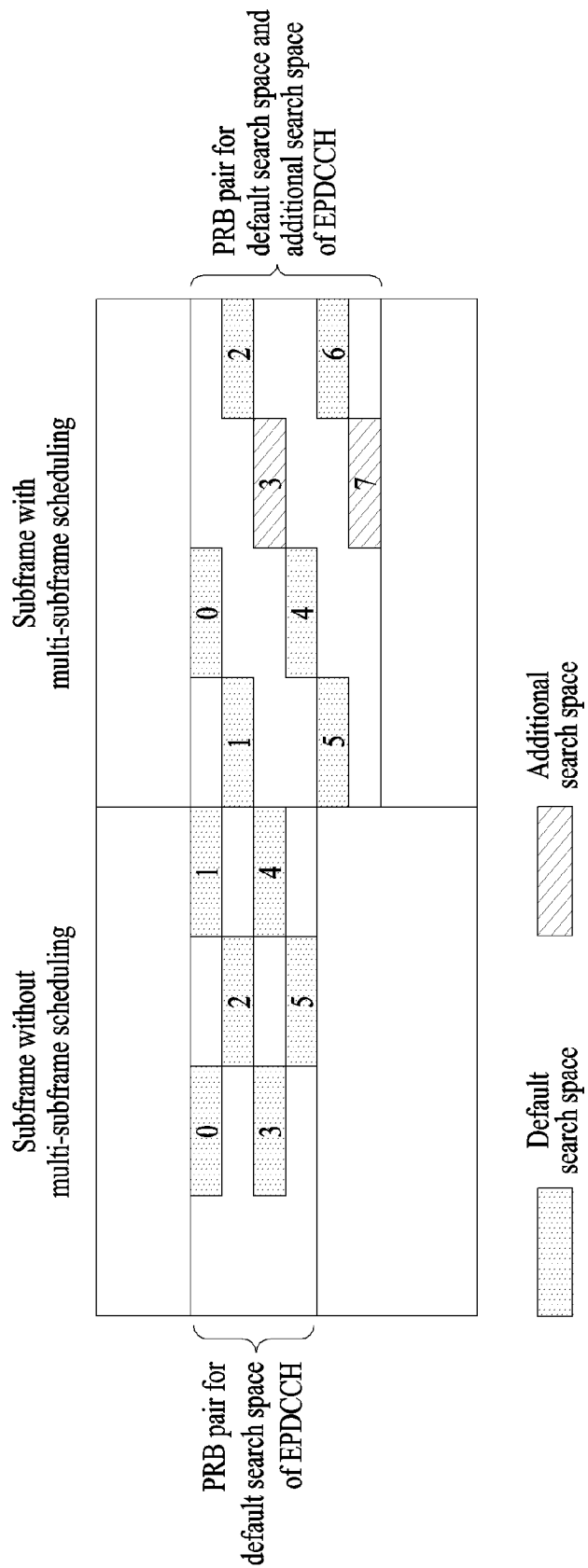

FIGS. 18, 19 and 20 illustrate examples of EPDCCH candidates configured according to embodiments of the present invention. In FIGS. 18, 19 and 20, indices of search space candidates are indicated in boxes that indicate the search space candidates.

FIG. 18 illustrates an example in which the additional search space uses a PRB pair configured for the default search space such that candidates of the additional search space are added to candidates of the default search space. Particularly, three default search space candidates are disposed and then followed by one additional search space candidate. Here, candidates #3 and #7 correspond to candidates of the additional search space.

FIG. 19 illustrates an example in which a separate PRB pair is set for the additional search space. That is, PRB pairs for the default search space are present and an additional PRB pair is set for the additional search space. In FIG. 19, candidates #6 and #7 correspond to candidates constituting the additional search space.

FIG. 20 illustrates an example in which configuration of PRB pairs for EPDCCHs in a subframe in which multi-subframe scheduling is performed differs from configuration of PRB pairs for EPDCCHs in a subframe in which multi-subframe scheduling is not performed. That is, a larger number of PRB pairs is configured in the subframe in which multi-subframe scheduling is performed. Specifically, three default search space candidates are disposed and then followed by one additional search space candidate, as in the configuration shown in FIG. 18. Here, candidates #3 and #7 correspond to candidates of the additional search space.

The configuration of FIG. 20 is required because it is necessary to transmit an EPDCCH using a larger amount of resources in the subframe in which multi-subframe scheduling is performed.

Figure 21:
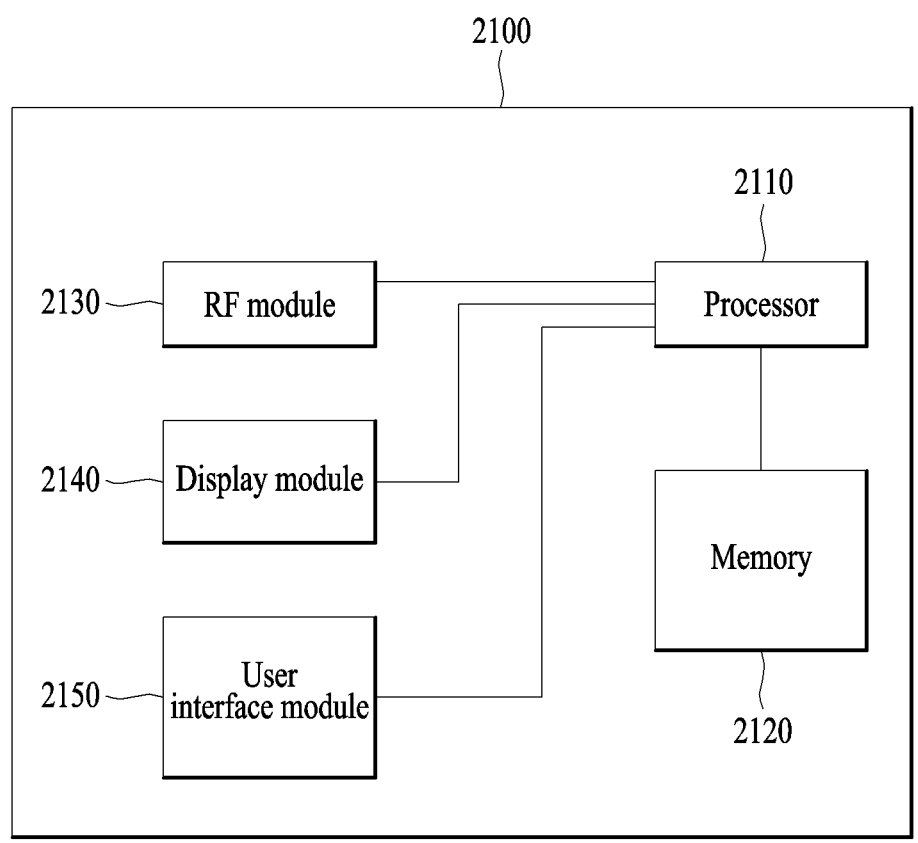
FIG. 21 is a block diagram of one example of a communication device according to one embodiment of the present invention.

FIG. 21 is a block diagram for one example of a communication device according to one embodiment of the present invention.

Referring to FIG. 21, a communication device 2100 includes a processor 2110, a memory 2120, an RF module 2130, a display module 2140 and a user interface module 2150.

The communication device 2100 is illustrated for clarity and convenience of the description and some modules can be omitted. Moreover, the communication device 2100 may further include at least one necessary module. And, some modules of the communication device 2100 can be further divided into sub-modules. The processor 2110 is configured to perform operations according to the embodiment of the present invention exemplarily described with reference to the accompanying drawings. In particular, the detailed operations of the processor 2110 can refer to the contents described with reference to FIGS. 1 to 20.

The memory 2120 is connected to the processor 2110 and stores an operating system, applications, program codes, data and the like. The RF module 2130 is connected to the processor 2110 and performs a function of converting a baseband signal to a radio signal or converting a radio signal to a baseband signal. For this, the RF module 2130 performs analog conversion, amplification, filtering and frequency uplink transform or inverse processes thereof. The display module 2140 is connected to the processor 2110 and displays various kinds of information. The display module 2140 can include such a well-known element as LCD (Liquid Crystal Display), LED (Light Emitting Diode), OLED (Organic Light Emitting Diode) and the like, by which the present invention is non-limited. The user interface module 2150 is connected to the processor 2110 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the method for setting a search space for detecting downlink control information in a wireless communication system and the apparatus therefor have been described on the basis of 3GPP LTE, the present invention is applicable to various wireless communication systems other than 3GPP LTE.

The invention claimed is:

1. A method for receiving, by a user equipment (UE), a control channel from a base station in a wireless communication, the method comprising:
   receiving a physical downlink control channel (PDCCH) signal in a subframe #n, where n is an integer;
   monitoring first control channel candidates among the first and second control channel candidates included in multiple search spaces corresponding to the PDCCH signal in the subframe #n in order to receive first control information corresponding to a subframe #n+k, where k is a predetermined number; and
   buffering the PDCCH signal until a subframe #n+1 and monitoring the second control channel candidates among the first and second control channel candidates included in the multiple search spaces corresponding to the buffered PDCCH signal in the subframe #n+1 in order to receive second control information corresponding to a subframe #n+k+1,
   wherein a resource region in which a search space for detecting the first control information is set differs from a resource region in which a search space for detecting the second control information is set.

2. The method according to claim 1, wherein indices of the first control channel candidates and indices of the second control channel candidates are consecutively set.

3. The method according to claim 1, wherein indices of the first control channel candidates and indices of the second control channel candidates are non-consecutively set according to a predetermined rule.

4. The method according to claim 1, wherein the resource region in which the search space for detecting the first control information is configured in the first physical resource block (PRB) pairs, and
   wherein the resource region in which the search space for detecting the second control information is configured in the second PRB pairs different from the first PRB pairs.

5. A user equipment (UE) in a wireless communication, the UE comprising:
   a radio frequency (RF) module configured to transmit signals to, and receive signals from, a base station; and
   a processor for processing the signals,
   wherein the processor is configured to:
     control the RF module to receive a physical downlink control channel (PDCCH) signal in a subframe #n, where n is an integer,
     monitor first control channel candidates among first and second control channel candidates included in multiple search spaces corresponding to the PDCCH signal in the subframe #n in order to receive first control information corresponding to a subframe #n+k, where k is a predetermined number, and
     buffer the PDCCH signal until a subframe #n+1 and monitor the second control channel candidates among the first and second control channel candidates included in the multiple search spaces corresponding to the buffered PDCCH signal in the subframe #n+1 in order to receive second control information corresponding to a subframe #n+k+1, and
   wherein a resource region in which a search space for detecting the first control information is set differs from a resource region in which a search space for detecting the second control information is set.

6. The UE according to claim 5, wherein indices of the first control channel candidates and indices of the second control channel candidates are consecutively set.

7. The UE according to claim 5, wherein indices of the first control channel candidates and indices of the second control channel candidates are non-consecutively set according to a predetermined rule.

8. The UE according to claim 5, wherein the resource region in which the search space for detecting the first control information is configured in a first physical resource block (PRB) pairs, and
   wherein the resource region in which the search space for detecting the second control information is configured in second PRB pairs different from the first PRB pairs.

* * * * *